(12) United States Patent
Blocker

(10) Patent No.: US 7,111,588 B2
(45) Date of Patent: *Sep. 26, 2006

(54) METHOD FOR SECURING AN ANIMAL TO AN OBJECT

(76) Inventor: Ted Blocker, 21111 Springwater Rd., Estacada, OR (US) 97023

( * ) Notice: Subject to any disclaimer, the term of this patent is extended or adjusted under 35 U.S.C. 154(b) by 21 days.

This patent is subject to a terminal disclaimer.

(21) Appl. No.: 10/770,618

(22) Filed: Feb. 2, 2004

(65) Prior Publication Data

US 2004/0154555 A1 Aug. 12, 2004

Related U.S. Application Data

(63) Continuation of application No. 10/046,958, filed on Jan. 14, 2002, now Pat. No. 6,684,613.

(60) Provisional application No. 60/263,423, filed on Jan. 22, 2001.

(51) Int. Cl.
*A01K 27/00* (2006.01)
(52) U.S. Cl. .................................................... 119/769
(58) Field of Classification Search ............... 119/769, 119/772, 774, 792, 794; 54/34, 19.3, 64; 24/130

See application file for complete search history.

(56) References Cited

U.S. PATENT DOCUMENTS

| | | | |
|---|---|---|---|
| 273,191 A * | 2/1883 | Thomas | ......................... 54/34 |
| 292,561 A | 1/1884 | Jones | |
| 299,481 A | 5/1884 | Lafferty | |
| 456,210 A | 7/1891 | Young et al. | |
| 498,562 A | 5/1893 | Milbrath | |
| 557,800 A * | 4/1896 | Gray | ......................... 24/134 R |
| 1,060,196 A | 4/1913 | Lukacs | |
| 1,210,433 A | 1/1917 | Forest | |
| 2,052,065 A * | 8/1936 | Wilslef | ......................... 119/772 |
| 2,987,845 A | 6/1961 | Bleiler | |
| 4,281,439 A | 8/1981 | Klein | |
| 6,115,889 A * | 9/2000 | Mickelson | ................. 24/115 R |

* cited by examiner

*Primary Examiner*—Peter M. Poon
*Assistant Examiner*—Susan C. Alimenti
(74) *Attorney, Agent, or Firm*—Kolisch Hartwell, P.C.

(57) ABSTRACT

A method of securing an animal to a fixed object with a securing device via a lead line is disclosed, wherein the securing device includes a frame and a retaining member coupled to the frame and is mounted to the object. The method includes inserting a segment of the lead line through the frame, extending the segment of the lead line around the retaining member, and pulling the lead line to bring the lead line into contact with the retaining member to thereby frictionally interlace the lead line with the frame and the retaining member such that a panicked animal can pull a length of lead line through the securing device.

4 Claims, 3 Drawing Sheets

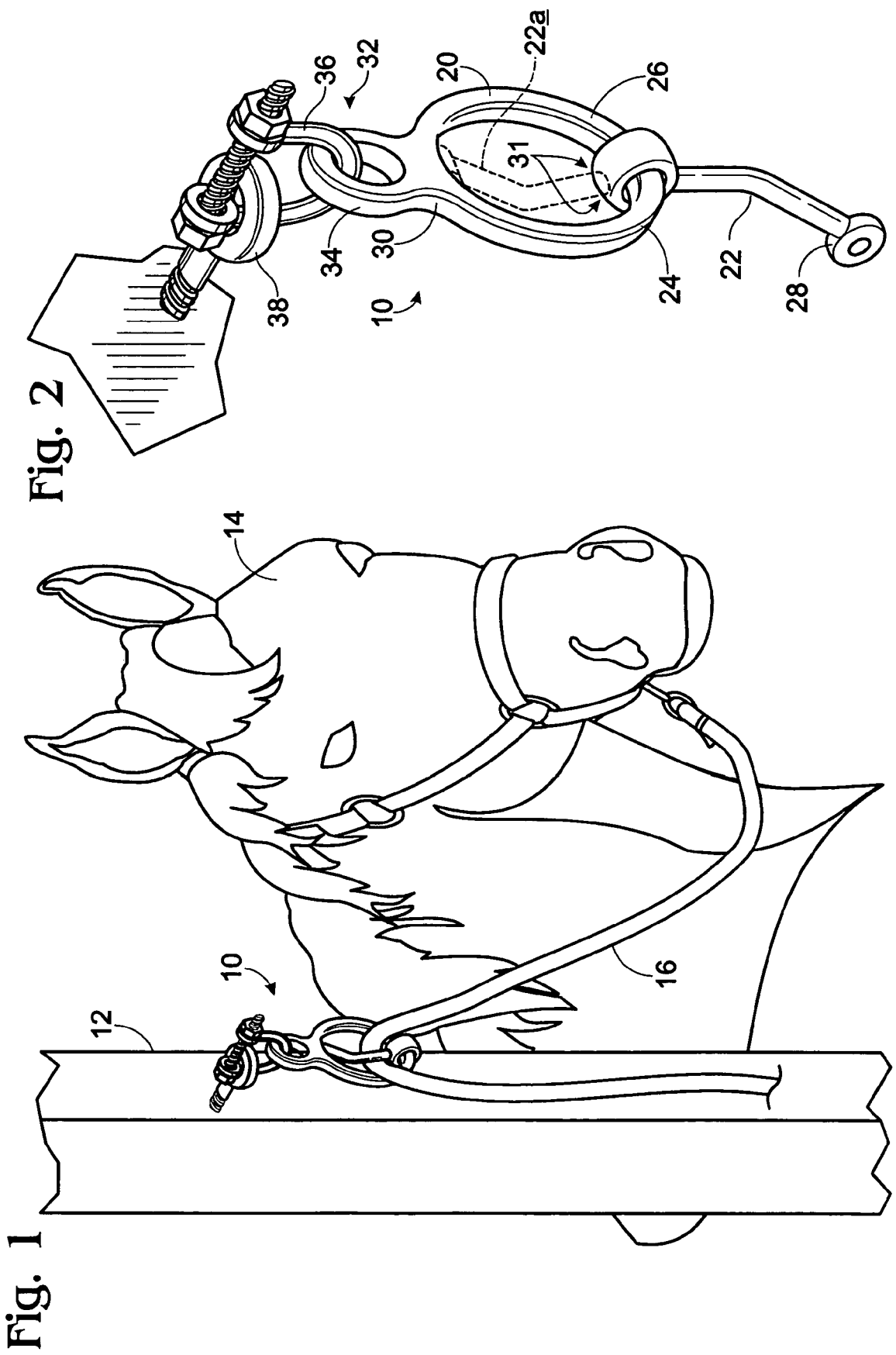

METHOD FOR SECURING AN ANIMAL TO AN OBJECT

CROSS-REFERENCE TO RELATED APPLICATIONS

This application is a continuation of U.S. patent application Ser. No. 10/046,958, filed Jan. 14, 2002, now U.S. Pat. No. 6,684,613 which claims priority from U.S. Provisional Patent Application Ser. No. 60/263,423, filed Jan. 22, 2001, the disclosures of which are incorporated by reference herein.

TECHNICAL FIELD

The present invention relates to a system for securing an animal to a fixed object. More particularly, the invention provides a system configured to frictionally retain a lead line such that an animal may pull a length of the lead line through the system when frightened or startled.

BACKGROUND OF THE INVENTION

Users of saddle and pack animals, such as horses, donkeys, llamas, camels, etc., sometimes must leave an animal unattended outside of an enclosed environment. To prevent the animal from wandering away, the user may sometimes tie or otherwise secure the animal to a fixed object with a lead line or rope.

In places where saddle or pack animals are frequently left unattended, various devices to which the animals may be tied are sometimes provided. One common example of such a device is a hitching post. A hitching post typically includes a horizontal bar to which the animals may be tied, and one or more vertical supports that support the horizontal bar off of the ground. Another common device to which an animal may be tied is a tie ring. A tie ring includes a ring to which a lead line may be tied, and some mechanism (for example, an eyebolt) for securing the ring to a post or other fixed object.

While known securing devices are simple to use and construct, they also have various drawbacks. For example, if an animal tied to a hitching post or tie ring pulls on the lead line excessively, the knot securing the horse to the tie ring may pull tight, making it difficult to untie the animal. Also, it may be difficult for beginning riders to learn how to tie the animal to these devices.

Furthermore, securing an animal to a fixed object with a knot may present various dangers. For example, if an animal is frightened or startled, the animal may pull back against the knot. If the knot used to tie the animal does not have any give, the animal may feel trapped. This may cause the animal to panic and pull harder against the knot. If the animal continues to panic, it may injure itself, and also may present a danger to anybody that attempts to untie it. This may be an especially dangerous situation if the animal is tied into a transport trailer, due to the confined nature of such trailers.

The use of an ordinary tie ring aboard a transport trailer may also present a serious danger when an animal falls down inside of the trailer. If the knot used to tie the animal into the trailer has no give, the animal's head may be twisted into an unnatural position by the tension of the lead rope when the animal falls. This may cause serious injury to the animal, and may also prevent the animal from getting its head and/or body into a position from which it can right itself. Furthermore, this may cause the animal to panic, and thus to present a danger to itself and anyone who enters the trailer to try to help the animal.

Various solutions to these problems have been proposed. For example, one solution involves tying the animal to an elastic device, for example an automobile inner tube, that is fixed to an object such as a wall, a tree, etc. If a panicked animal pulls against the inner tube, the inner tube may stretch, which may prevent the animal from injuring itself. However, because the elastic member exerts a continuous force against the animal when the animal pulls against it, the animal may have the feeling that it is trapped, and may become panicked. Also, the continuous pull may cause the animal to tend to fight against the elastic member. This may tend to reinforce any pull back problems the animal may have.

Another known solution involves the use of a quick-release device that releases when an animal pulls against the device with enough force. While quick-release devices allow a panicked animal to free itself, the sudden nature of the release may cause the lead line to snap back toward the animal with enough force to injure the animal. Furthermore, the animal may fall down due to the sudden release of the lead line. Finally, the release of the lead line may leave the animal completely unsecured to any fixed object, and thus free to wander off.

SUMMARY OF THE INVENTION

A method of securing an animal to a fixed object with a securing device via a lead line is provided, wherein the securing device includes a frame and a retaining member coupled to the frame and is mounted to the object. The method includes inserting a segment of the lead line through the frame, extending the segment of the lead line around the retaining member, and pulling the lead line to bring the lead line into contact with the retaining member to thereby frictionally interlace the lead line with the frame and the retaining member such that a panicked animal can pull a length of lead line through the securing device.

BRIEF DESCRIPTION OF THE DRAWINGS

FIG. 1 is a perspective view of a first embodiment of a securing system according to the present invention, with a horse secured to the system.

FIG. 2 is an isometric view of the securing system of FIG. 1.

DETAILED DESCRIPTION OF THE PREFERRED EMBODIMENTS

Figure 3:
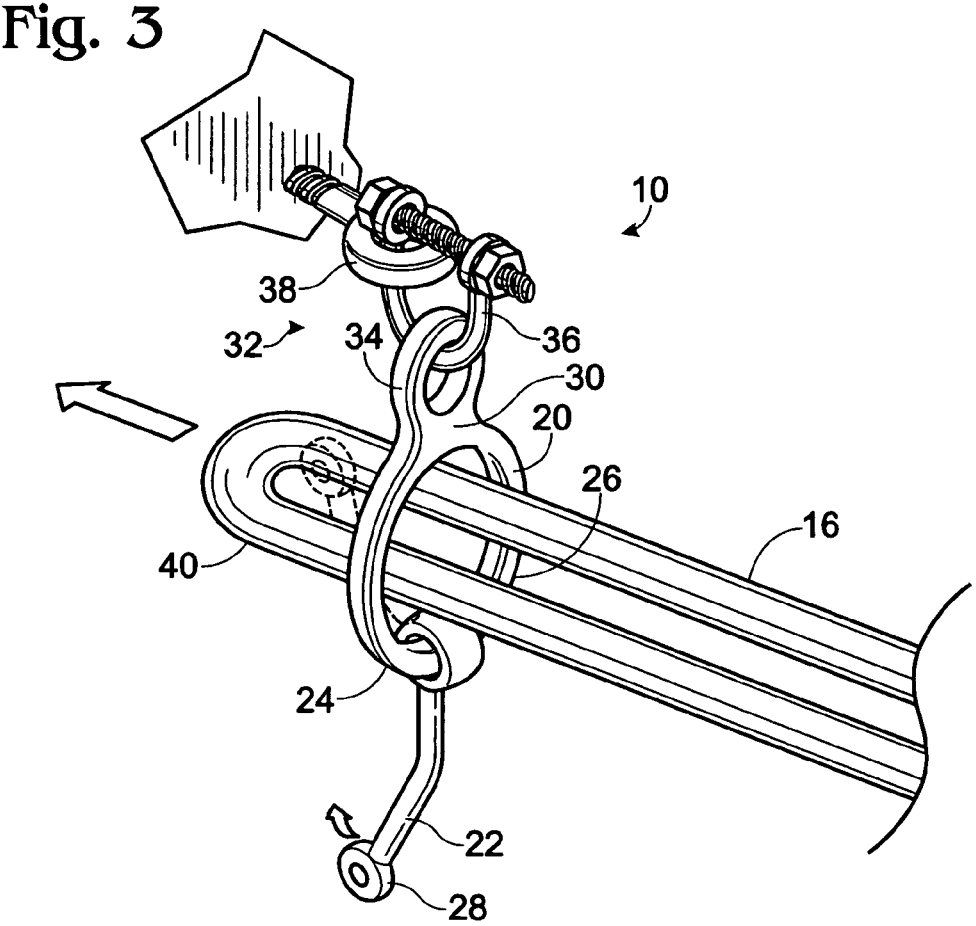
FIG. 3 is an isometric view of the securing system of FIG. 1, with a loop of a lead line inserted partially through the securing system.

A first embodiment of a system for securing an animal according to the present invention is shown, generally at 10, in FIG. 1. As depicted, securing system 10 is mounted to a post 12, and is used to secure a horse 14 to the post with a rope or other lead line 16. However, it will be appreciated that securing system 10 may be used to secure any desired type of animal, and may be mounted to any other suitable surface or object, such as a tree, a wall, or an inside surface of a trailer, or may be used on a picket line, as described in more detail below.

Securing system 10 is configured to frictionally retain a lead line, without any need for a knot to fix the lead line to the securing system. Generally, a securing system according to the present invention includes a plurality of spaced-apart members configured to accept a length of lead line in an interwoven or interlaced fashion. When the lead line is pulled, the friction exerted against the sides of the lead line by the spaced-apart members causes the lead line to resist being pulled through the securing system.

The plurality of spaced-apart members may be arranged in any desired manner. For example, the plurality of spaced-apart members may be arranged parallel to one another, in a comb-shaped array. In the depicted embodiment, however, securing system 10 includes a frame 20, and a retaining member 22 coupled with the frame. The structure of securing system 10 is shown in more detail in FIG. 2. The spaced-apart members correspond to a first side 24 of frame 20, a second side 26 of the frame, and retaining member 22. Securing system 10 is configured to have lead line 16 coupled in such a manner that it is woven behind retaining member 22 and in front of first side 24 and second side 26 of frame 20. Each point of contact of lead line 16 with first and second sides 24, 26 of frame 20 and with retaining member 22 contributes to the frictional retention of the lead line by securing system 10.

Ordinarily, securing system 10 exerts a sufficiently strong frictional force on lead line 16 for an animal to perceive that it is tied to object 12. However, the frictional force may be overcome with a sufficiently strong pull, allowing an animal secured to securing system 10 to pull a length of lead line through the securing system should the need arise. For example, if an animal secured to a securing system 10 inside of a trailer falls down, lead line 16 may be pulled through securing system 10 sufficiently to prevent the animal from hanging itself. Also, the animal may be able to pull a sufficient length of lead line 16 through securing system 10 to get its head and/or body into a position from which it can right itself.

Likewise, if a startled or panicked animal pulls against securing system 10, it may be able to pull a sufficient amount of lead line 16 through the securing system to realize that it is not trapped. This may help calm the animal, and also may allow the animal to pull back sufficiently to assess the situation, further helping to prevent panic. Furthermore, unlike the use of a quick-release mechanism, the animal remains secured to securing system 10 even after pulling a length of lead line 16 through the securing system. It may be possible for a sufficiently panicked animal to pull the entire lead line, typically 8–10 feet long, through securing system 10. However, a knot may be tied in the end of lead line 16 to prevent the lead line from being pulled free of securing system 10 if desired.

Frame 20 may have any suitable shape and construction. In the depicted embodiment, frame 20 has a generally curvilinear shape, and more particularly, a ring shape. The use of a curvilinear frame may be advantageous, as a frame of this shape may not have sharp corners or other snags on which a lead line may become snagged, or on which an animal may injure itself. Additionally, a ring-shaped frame may be combined with an elongate retaining member 22 to form a securing system 10 with an appearance similar to one-half of a snaffle bit, as shown in FIG. 2. This appearance may be familiar or pleasing to owners or users of riding and/or pack animals. Frame 20 is typically constructed of a rigid, weather-resistant material, such as stainless steel, but may be constructed of any other suitable material without departing from the scope of the present invention.

Likewise, retaining member 22 may have any suitable configuration. Generally, retaining member 22 is configured to retain a loop of lead line 16 that is looped around the retaining member, and to cause friction against the lead line when the lead line is pulled. In the embodiment shown in FIG. 2, retaining member 22 has an elongate configuration, and is pivotally attached to frame 20 such that it is pivotal between an open position, shown in solid lines at 22, and a closed position, shown in dashed lines at 22a. When in the closed position, the free end 28 of the retaining member rests against a top portion 30 of frame 20. This prevents lead line 16 from becoming accidentally disengaged from securing system 10 by slipping over the top of retaining member 22. Free end 28 of retaining member 22 may include an expanded portion, such as the ring-shaped portion shown in the depicted embodiment, to further help prevent lead line 16 from slipping over the top of retaining member 22.

Retaining member 22 may have either a straight shape, or may have a bent or curved shape. The use of a bent or curved retaining member 22 may be desirable, as such a shape may be used to force lead line 16 to move toward a desired position along the retaining member when the lead line is pulled. For example, in the depicted embodiment, retaining member 22 has a bent shape that is configured to drive lead line 16 towards the bottom of frame 20, to where retaining member 22 is coupled with frame 20, when the lead line is pulled. This may help to prevent lead line 16 from accidentally slipping over the top of retaining member 22. Furthermore, this may help to drive lead line 16 into the corners 31 formed where retaining member 22 meets frame 20, and thus may help to increase the friction exerted by securing system 10 on lead line 16. In this manner, the amount of friction exerted against lead line 16 may be varied by varying the thickness and/or the flexibility of the lead line. The use of a thinner and/or more flexible lead line 16 may result in the exertion of less friction against the lead line, while the use of a thicker and/or less flexible lead line may result in the exertion of more friction against the lead line.

In addition to frame 20 and retaining member 22, securing system 10 also typically has a mounting structure coupled with the frame and the retaining member that is configured to allow securing system 10 to be mounted to a desired object. The mounting structure may have any suitable form that facilitates the mounting of securing system 10 to an object. For example, the mounting structure may take the form of an eyebolt through which frame 20 is threaded. In the depicted embodiment, however, the mounting structure, indicated generally at 32, takes the form of a mounting ring 34 coupled with frame 20. Ring 34 is configured to accept the attachment of a coupling device, such as a U-bolt 36. In turn, U-bolt 36 may then be coupled to another fastener, such as eyebolt 38, that is fastened to a selected object. If a more permanent attachment of securing system 10 to the object is desired, eyebolt 38 may be attached directly to mounting ring 34, without the use of U-bolt 36. However, this may increase the difficulty of moving securing system 10 between different locations. Also, while mounting ring 34 is depicted as having a generally circular shape, it will be appreciated that the mounting ring may have any other suitable shape, such as a polygonal shape, without departing from the scope of the present invention. Furthermore, while mounting ring 34 is depicted as being integral with frame 20, it will be appreciated that the mounting ring may also be formed as a separate part that is welded, bolted, riveted or otherwise coupled to frame 20.

Figure 4:
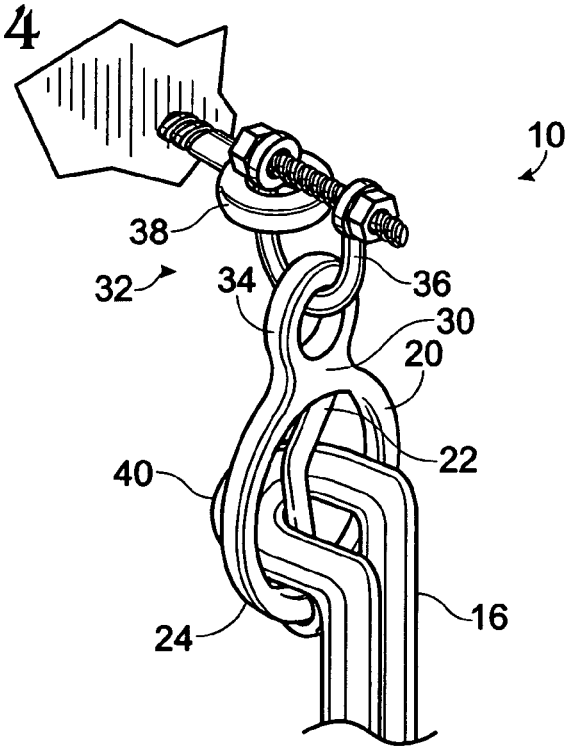
FIG. 4 is an isometric view of the securing system of FIG. 1, with a loop of lead line secured in the system.

Securing system 10 offers the advantage over known tie rings and hitching posts that lead line 16 may be coupled to the securing system without the use of any knots. The coupling of lead line 16 to securing system 10 is shown in more detail in FIGS. 3–4. Referring to FIG. 3, a loop 40 of lead line 16 is first inserted through the opening defined by frame 20. Next, retaining member 22 is moved from the opened position to the closed position and through loop 40 so that the loop extends around the retaining member. Referring next to FIG. 4, lead line 16 is secured by pulling loop 40 downwardly against retaining member 22 and sides 24 and 26 of frame 20. Lead line 16 may be removed from securing system 10 simply by pushing loop 40 back through frame 20 far enough for retaining member 22 to fall free of loop 40, and then pulling the loop out of the frame.

Figure 5:
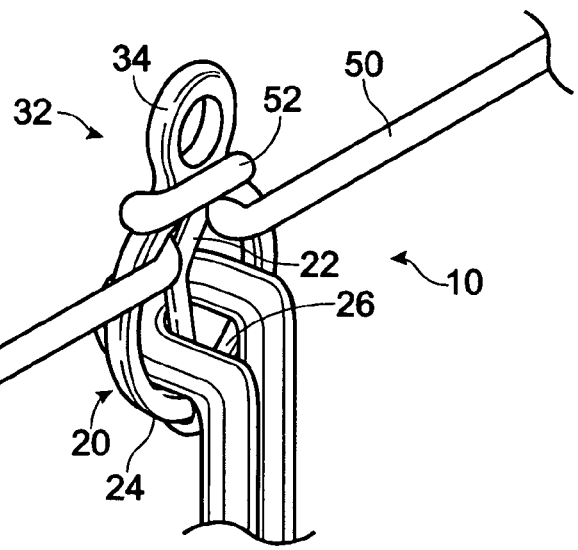
FIG. 5 is a perspective view of the securing system of FIG. 1, mounted to a picket line.

FIG. 5 shows the use of securing system 10 on a picket line 50. A picket line is a line stretched between two (or more) objects to which animals may be attached. Ordinarily, an animal is attached to a picket line by tying the animal to a steel ring that is tied into the picket line. However, tying the animal to the picket line presents a danger of the animal becoming entangled either in the tie line or the picket line, as well as the danger of a panicked animal feeling trapped.

Securing system 10 may be used in the place of an ordinary steel ring on a picket line to allow an animal to be more safely secured to a picket line. As shown in FIG. 5, securing system 10 may be attached to picket line 50 simply by pulling a loop 52 of the picket line through frame 20 and then over mounting ring 34. Once securing system 10 is attached to picket line 50, a lead line may be attached to the securing system via the methods described above.

Figure 6:
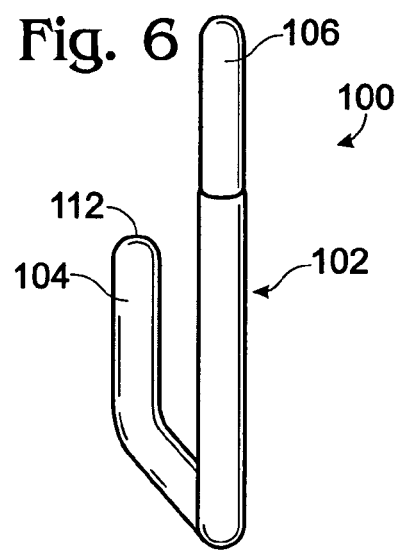
FIG. 6 is a side view of a second embodiment of a securing system according to the present invention.
Figure 7:
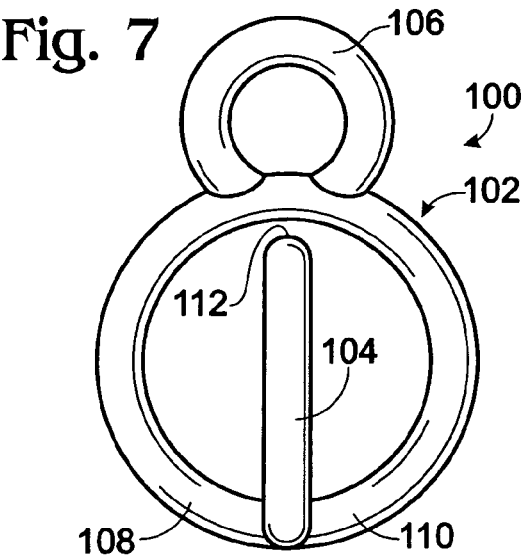
FIG. 7 is a front view of the embodiment of FIG. 6.

FIGS. 6–7 show, generally at 100, a second embodiment of a securing system according to the present invention. Securing system 100 is similar in many respects to securing system 10 of FIGS. 1–5. For example, securing system 100 includes a frame 102, a retaining member 104 and a mounting structure 106. Frame 102 includes a first side 108 and a second side 110, which, together with retaining member 104, form a plurality of spaced-apart members around which a lead line may be interwoven or interlaced to frictionally secure the lead line to the securing system.

However, unlike retaining member 22 of securing system 10, retaining member 104 of securing system 100 is fixed to frame 102, and does not pivot between open and closed positions with respect to the frame. Instead, to allow a loop of lead line to be extended around the retaining member, retaining member 104 has a free end 112 over which the loop of lead line may be placed. Retaining member 104 is typically long enough to prevent the loop of lead line from accidentally slipping over free end 112 of the retaining member.

Retaining member 104 may have any suitable shape. For example, retaining member 104 may have a bent shape, as depicted in FIGS. 6–7. The use of a bent shape may be advantageous, as described above, as this shape tends to drive the lead line downwardly toward the bottom of the retaining member when pulled. Alternatively, retaining member 104 may have a straight configuration, and may extend either fully within the space defined by frame 102 or outwardly from this space.

Figure 8:
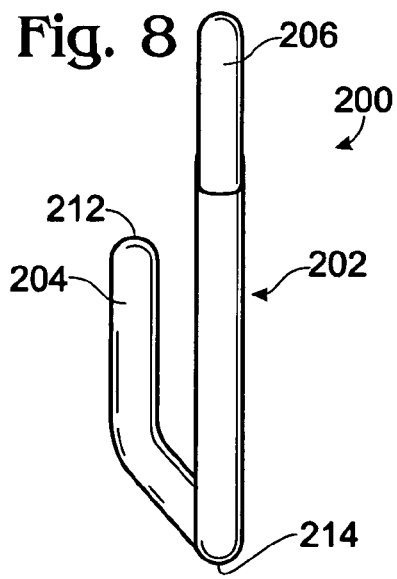
FIG. 8 is a side view of a third embodiment of a securing system according to the present invention.
Figure 9:
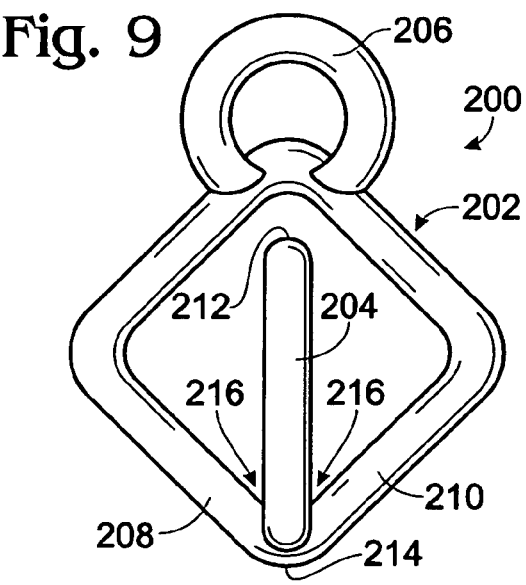
FIG. 9 is a front view of the embodiment of FIG. 8.

FIGS. 8 and 9 show, generally at 200, a third embodiment of a securing system according to the present invention. Securing system 200 is similar in many respects to securing system 100 of FIGS. 6–7. For example, securing system 200 includes a frame 202, a retaining member 204 and a mounting structure 206. Additionally, frame 202 includes a first side 208 and a second side 210, which, together with retaining member 204, form a plurality of spaced-apart members around which a lead line may be interwoven or interlaced to frictionally secure the lead line to the securing system. Furthermore, retaining member 204 is fixed to frame 202, and has a free end 212 over which a loop of a lead line may be placed to attach the lead line to securing system 200.

However, unlike frame 102 of securing system 100, frame 202 of securing system 200 has a polygonal shape, rather than a circular or oval shape. The use of a polygonal frame may offer some advantages over other shapes. For example, if retaining member 204 is coupled with frame 202 at a corner 214 of polygonal frame 202 (as shown in the depicted embodiment), the interior corners 216 where the retaining member meets the frame may be tighter than the corresponding interior corners of a round frame of a similar size, and thus may cause a greater frictional force on a lead line that is pulled into corners 216.

While securing system 200 has a rectangular frame, it will be appreciated that a frame of any other suitable polygonal shape may be used without departing from the scope of the present invention. Furthermore, while retaining member 204 is shown as being fixed to frame 200, retaining member 204 may also be pivotally coupled, or otherwise movably coupled, with frame 202 without departing from the scope of the present invention.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

I claim:

1. A method of securing an animal to a fixed object with a securing device, wherein a lead line is coupled to the animal, and wherein the securing device is mounted to the object and the securing device includes a frame having an opening and a retaining member coupled to the frame, wherein the retaining member includes a surface configured to engage the lead line, the surface extending across a portion of the opening, at an angle relative to the opening such that a portion of the surface disposed proximate an interior region of the opening is further from the opening than a portion of the surface disposed proximate a peripheral region of the opening, the method comprising:
- forming a bight in the lead line;
- inserting the bight through the opening;
- extending the bight around the retaining member; and
- pulling the lead line to bring the lead line into frictional engagement with the frame and the retaining member to impart a frictional holding force on the lead line, and thereby laterally moving the lead line along the retaining member toward a peripheral region of the opening.

2. The method of claim 1, wherein the retaining member is pivotally coupled to the frame.

3. The method of claim 1, wherein the opening tapers from a central region of the opening towards a location on the frame at which the retaining member is adjacent to the frame, whereby pulling on the lead line increasingly binds the lead line as the lead line shifts sideways along the retaining member toward the peripheral region of the opening.

4. A method of securing an animal to a fixed object with a securing device, wherein a lead line is coupled to the animal, and wherein the securing device includes a frame and a retaining member coupled to the frame and is mounted to the object, the method comprising:
- inserting a segment of the lead line through the frame;
- extending the segment of the lead line around the retaining member;
- pulling the lead line to bring the lead line into contact with the retaining member to thereby frictionally interlace the lead line with the frame and the retaining member such that a panicked animal can pull a length of lead line through the securing device, wherein the securing device includes a mounting structure coupled to the frame; and
- mounting the securing device to the object via the mounting structure before inserting the segment of the lead line through the frame,
- wherein mounting the securing device to the object via the mounting structure includes fastening the securing device to the object with an eyebolt coupled to the mounting structure.

* * * * *